(12) United States Patent
Inoue et al.

(10) Patent No.: US 10,400,893 B2
(45) Date of Patent: Sep. 3, 2019

(54) TRANSMISSION AND CONTROL METHOD FOR TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Mamiko Inoue, Isehara (JP); Tomonari Uchiyama, Hadano (JP); Hideshi Wakayama, Hadano (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 63 days.

(21) Appl. No.: 15/738,904

(22) PCT Filed: Jun. 13, 2016

(86) PCT No.: PCT/JP2016/067531
§ 371 (c)(1),
(2) Date: Dec. 21, 2017

(87) PCT Pub. No.: WO2016/208438
PCT Pub. Date: Dec. 29, 2016

(65) Prior Publication Data
US 2018/0180178 A1  Jun. 28, 2018

(30) Foreign Application Priority Data
Jun. 23, 2015 (JP) .................. 2015-125529

(51) Int. Cl.
| F16H 61/70 | (2006.01) |
| F16H 61/662 | (2006.01) |
| F16H 61/66 | (2006.01) |
| F16H 37/02 | (2006.01) |
| F16H 61/00 | (2006.01) |
| F16H 61/686 | (2006.01) |

(52) U.S. Cl.
CPC ......... *F16H 61/702* (2013.01); *F16H 37/022* (2013.01); *F16H 61/0021* (2013.01); *F16H 61/66* (2013.01); *F16H 61/662* (2013.01); *F16H 61/686* (2013.01); *F16H 2061/6614* (2013.01)

(58) Field of Classification Search
None
See application file for complete search history.

(56) References Cited

U.S. PATENT DOCUMENTS 9,279,496 B2 * 3/2016 Woo ................. F16H 61/66259
2015/0080156 A1   3/2015 Takahashi et al.

FOREIGN PATENT DOCUMENTS

WO   WO 2013/145967 A1   10/2013

* cited by examiner

*Primary Examiner* — Dirk Wright
(74) *Attorney, Agent, or Firm* — Foley & Lardner LLP

(57) ABSTRACT

In a transmission, a controller sets a target line pressure to an offset target value, which is a value obtained by adding a positive offset amount to one of a target PRI pressure and a target SEC pressure, in a speed ratio range in which the offset target value is higher than the other at least during an inertia phase in a sub-transmission mechanism when a coordinated shift is carried out. At that time, the one of the target PRI pressure and the target SEC pressure is the target SEC pressure when a variator is downshifted by the coordinated shift while being the target PRI pressure when the variator is upshifted by the coordinated shift.

6 Claims, 8 Drawing Sheets

TRANSMISSION AND CONTROL METHOD FOR TRANSMISSION

TECHNICAL FIELD

The present invention relates to a transmission and a control method for transmission.

BACKGROUND ART

There is known a continuously variable transmission mechanism of a double pressure adjusting type configured to change speed by changing both a primary pressure supplied to a primary pulley and a secondary pressure supplied to a secondary pulley and changing a groove width of each pulley.

It is disclosed in WO2013/145967 to set a target line pressure to a value obtained by adding a predetermined offset amount to the higher one of a target primary pressure and a target secondary pressure in a cross point region. The cross point region is a region where an absolute value of a deviation obtained by subtracting the target primary pressure from the target secondary pressure is smaller than a predetermined deviation.

SUMMARY OF INVENTION

In a transmission, a stepped transmission mechanism is provided in series with a continuously variable transmission mechanism and a coordinated shift may be carried out to change a speed ratio of the continuously variable transmission mechanism in a direction opposite to a changing direction of a speed ratio of the stepped transmission mechanism as the stepped transmission mechanism is shifted. However, if a technique of WO2013/145967 described above is used in such a transmission, a hydraulic pressure shortage may occur as follows when the coordinated shift is started in a cross point region.

Specifically, in this case, a target line pressure decreases immediately before the speed ratio of the continuously variable transmission mechanism deviates from the cross point region. Further, the target line pressure increases after the speed ratio of the continuously variable transmission mechanism deviates from the cross point region. Thus, in this case, an actual line pressure may undershoot the target line pressure due to an increase of the target line pressure after a decrease.

For example, in the case of carrying out a coordinated shift to upshift the stepped transmission mechanism and downshift the continuously variable transmission mechanism, the speed ratio of the continuously variable transmission mechanism deviates toward a Low side from the cross point region and, at this time, the actual line pressure may undershoot.

According to the technique of WO2013/145967, since the target line pressure is set at the target secondary pressure on a lower side than the cross point region, an actual secondary pressure may also decrease if the actual line pressure undershoots. As a result, a hydraulic pressure shortage may occur at the secondary pulley and troubles such as the slip of a belt may occur.

The present invention was developed in view of such technical problems and aims to provide a transmission and a control method for transmission capable of improving a situation where a hydraulic pressure shortage occurs in a continuously variable transmission mechanism during a coordinated shift.

A transmission according to a certain aspect of the present invention includes a continuously variable transmission mechanism including a primary pulley, a secondary pulley and a belt mounted on the primary pulley and the secondary pulley, a primary pressure being supplied to the primary pulley, a secondary pressure being supplied to the secondary pulley, the continuously variable transmission mechanism being provided in a power transmission path for transmitting power from a drive source of a vehicle to drive wheels, a stepped transmission mechanism provided in series with the continuously variable transmission mechanism in the power transmission path, a line pressure adjusting unit configured to adjust a line pressure, a primary pressure adjusting unit configured to adjust the primary pressure using the line pressure as a source pressure, a secondary pressure adjusting unit configured to adjust the secondary pressure using the line pressure as a source pressure, a shift control unit configured to carry out a coordinated shift for changing a speed ratio of the continuously variable transmission mechanism in a direction opposite to a changing direction of a speed ratio of the stepped transmission mechanism as the stepped transmission mechanism is shifted, and a setting unit configured to set a target value of the line pressure. In setting the target value of the line pressure to an offset target value, the offset target value being a value obtained by adding a positive offset amount to one of a target value of the primary pressure and a target value of the secondary pressure, in a speed ratio range in which the offset target value is higher than the other target value at least during an inertia phase in the stepped transmission mechanism when the coordinated shift is carried out, the setting unit sets the one target value to the target value of the secondary pressure when the continuously variable transmission mechanism is downshifted by the coordinated shift and setting the one target value to the target value of the primary pressure when the continuously variable transmission mechanism is upshifted by the coordinated shift.

According to another aspect of the present invention, a control method for a transmission with a continuously variable transmission mechanism including a primary pulley, a secondary pulley and a belt mounted on the primary pulley and the secondary pulley, a primary pressure being supplied to the primary pulley, a secondary pressure being supplied to the secondary pulley, the continuously variable transmission mechanism being provided in a power transmission path for transmitting power from a drive source of a vehicle to drive wheels, a stepped transmission mechanism provided in series with the continuously variable transmission mechanism in the power transmission path, a line pressure adjusting unit configured to adjust a line pressure, a primary pressure adjusting unit configured to adjust the primary pressure using the line pressure as a source pressure, and a secondary pressure adjusting unit configured to adjust the secondary pressure using the line pressure as a source pressure is provided. The control method for the transmission includes carrying out a coordinated shift for changing a speed ratio of the continuously variable transmission mechanism in a direction opposite to a changing direction of a speed ratio of the stepped transmission mechanism as the stepped transmission mechanism is shifted, and in setting the target value of the line pressure to an offset target value, the offset target value being a value obtained by adding a positive offset amount to one of a target value of the primary pressure and a target value of the secondary pressure, in a speed ratio range in which the offset target value is higher than the other target value at least during an inertia phase in the stepped transmission mechanism when the coordinated shift is carried out, setting the one target value to the target value of the secondary pressure when the continuously variable transmission mechanism is downshifted by the coordinated shift and setting the one target value to the target value of the primary pressure when the continuously variable transmission mechanism is upshifted by the coordinated shift.

According to these aspects, by setting the target value of the line pressure to the offset target value as described above, the target value of the line pressure can be increased according to a speed ratio change when the coordinated shift is started in a cross point region and the speed ratio of the continuously variable transmission mechanism is changed. Specifically, the target value of the line pressure can be prevented from increasing after decreasing.

Thus, according to these aspects, the actual line pressure can be prevented from undershooting due to an increase of the target value of the line pressure after a decrease. Therefore, a situation where a hydraulic pressure shortage occurs in the continuously variable transmission mechanism during the coordinated shift can be improved.

DESCRIPTION OF EMBODIMENT

Hereinafter, an embodiment of the present invention is described with reference to the accompanying drawings.

Figure 1:
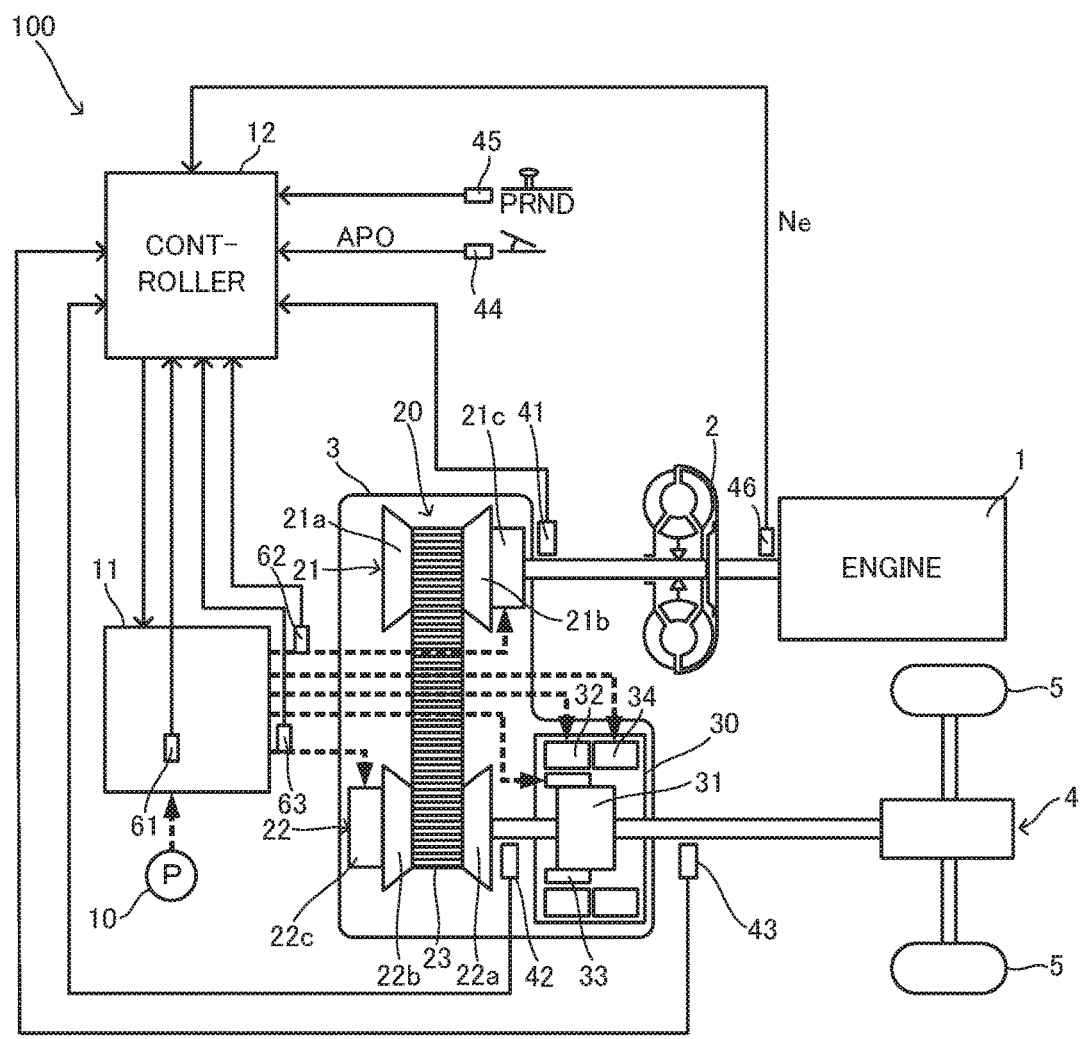
FIG. 1 is a diagram showing an essential part of a vehicle including a transmission.

FIG. 1 is a diagram showing an essential part of a vehicle including a transmission 100. The vehicle includes an engine 1, a torque converter 2, a variator 20, a sub-transmission mechanism 30, a vehicle axle part 4 and drive wheels 5.

The engine 1 constitutes a drive source of the vehicle. The torque converter 2 transmits power via fluid. The variator 20 and the sub-transmission mechanism 30 convert an input rotation speed and output a rotation speed corresponding to a speed ratio. The vehicle axle part 4 is configured to include a reduction gear, a differential device and a drive axle. Power of the engine 1 is transmitted to the drive wheels 5 via the torque converter 2, the variator 20, the sub-transmission mechanism 30 and the vehicle axle part 4.

The variator 20 is a continuously variable transmission mechanism and includes a primary pulley 21, a secondary pulley 22 and a belt 23. Primary is referred to as PRI and secondary is referred to as SEC below.

The PRI pulley 21 includes a fixed pulley 21a, a movable pulley 21b and a PRI chamber 21c. In the PRI pulley 21, a PRI pressure is supplied to the PRI chamber 21c.

The SEC pulley 22 includes a fixed pulley 22a, a movable pulley 22b and a SEC chamber 22c. In the SEC pulley 22, a SEC pressure is supplied to the SEC chamber 22c.

The belt 23 is wound on a V-shaped sheave surface formed by the fixed pulley 21a and the movable pulley 21b of the PRI pulley 21 and a V-shaped sheave surface formed by the fixed pulley 22a and the movable pulley 22b of the SEC pulley 22.

The variator 20 constitutes a belt continuously variable transmission mechanism for changing speed by changing each of groove widths of the PRI pulley 21 and the SEC pulley 22 to change a winding diameter of the belt 23.

In such a variator 20, the movable pulley 21b operates to change the groove width of the PRI pulley 21 by controlling the PRI pressure. Further, the movable pulley 22b operates to change the groove width of the SEC pulley 22 by controlling the SEC pressure.

The sub-transmission mechanism 30 is a stepped transmission mechanism and has two forward and one reverse gear positions. The sub-transmission mechanism 30 has a first speed and a second speed having a smaller speed ratio than the first speed as the forward gear positions. The sub-transmission mechanism 30 is provided in series on an output side of the variator 20 in a power transmission path from the engine 1 to the drive wheels 5. The sub-transmission mechanism 30 may be directly connected to the variator 20 or may be indirectly connected to the variator 20 via another configuration such as a gear train.

The sub-transmission mechanism 30 is provided with a planetary gear mechanism 31 and a plurality of friction engaging elements including a low brake 32, a high clutch 33 and a reverse brake 34. The gear position of the sub-transmission mechanism 30 is changed by adjusting hydraulic pressures supplied to the plurality of friction engaging elements and changing engaged/disengaged states of the plurality of friction engaging elements.

For example, if the low brake 32 is engaged and the high clutch 33 and the reverse brake 34 are disengaged, the gear position is set to the first speed. Further, if the high clutch 33 is engaged and the low brake 32 and the reverse brake 34 are disengaged, the gear position is set to the second speed. Further, if the reverse brake 34 is engaged and the low brake 32 and the high clutch 33 are disengaged, the gear position is set to the reverse speed.

In the vehicle, the speed ratio is changed in each of the variator 20 and the sub-transmission mechanism 30. Thus, in the vehicle, a shift is carried out according to a through speed ratio which is an overall speed ratio of the variator 20 and the sub-transmission mechanism 30. The through speed ratio is a speed ratio obtained by multiplying the speed ratio of the variator 20 by the speed ratio of the sub-transmission mechanism 30.

The variator 20 constitutes an automatic transmission mechanism 3 together with the sub-transmission mechanism 30. The variator 20 and the sub-transmission mechanism 30 may be configured as structurally individual transmission mechanisms.

The vehicle further includes an oil pump 10, a hydraulic control circuit 11 and a controller 12.

The oil pump 10 feeds oil under pressure. A mechanical oil pump configured to be driven by the power of the engine 1 can be used as the oil pump 10.

The hydraulic control circuit 11 adjusts a pressure of the oil fed under pressure from the oil pump 10, i.e. a hydraulic pressure and transmits the adjusted hydraulic pressure to each component of the variator 20 and the sub-transmission mechanism 30.

Figure 2:
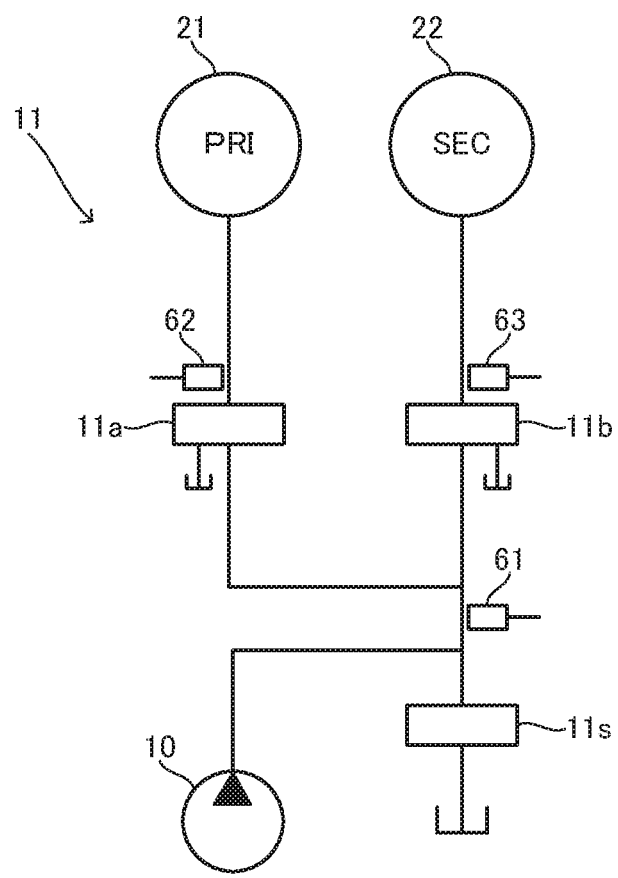
FIG. 2 is a diagram showing an essential part of a hydraulic control circuit.

FIG. 2 is a diagram showing an essential part of the hydraulic control circuit 11. The hydraulic control circuit 11 includes a line pressure adjusting unit 11s, a PRI pressure adjusting unit 11a and a SEC pressure adjusting unit 11b. The hydraulic control circuit 11 may be grasped as a configuration including the oil pump 10.

The line pressure adjusting unit 11s generates and adjusts a line pressure PL on the basis of the pressure of the oil fed under pressure from the oil pump 10, i.e. a hydraulic pressure. The line pressure PL is a hydraulic pressure serving as a source pressure for the PRI pressure and the SEC pressure, and is set such that the belt 23 does not slip. The line pressure PL is detected by a line pressure sensor 61.

The PRI pressure adjusting unit 11a adjusts the PRI pressure using the line pressure PL as the source pressure. The PRI pressure is detected by a PRI pressure sensor 62. The SEC pressure adjusting unit 11b adjusts the SEC pressure using the line pressure PL as the source pressure. The SEC pressure is detected by a SEC pressure sensor 63. Hydraulic regulators, for example, composed of linear solenoid valves can be used as the line pressure adjusting unit 11s, the PRI pressure adjusting unit 11a and the SEC pressure adjusting unit 11b.

Referring back to FIG. 1, the controller 12 is an electronic control device and controls the hydraulic control circuit 11. Output signals of rotation sensors 41, 42 and 43 besides the line pressure sensor 61, the PRI pressure sensor 62 and the SEC pressure sensor 66 are input to the controller 12.

The rotation sensor 41 is a variator input-side rotation sensor for detecting a rotation speed on an input side of the variator 20. The rotation sensor 42 is a variator output-side rotation sensor for detecting a rotation speed on an output side of the variator 20. The rotation sensor 42 specifically detects the rotation speed on the output side of the variator 20 and on an input side of the sub-transmission mechanism 30. The rotation sensor 43 is a sub-transmission mechanism output-side rotation sensor for detecting a rotation speed on an output side of the sub-transmission mechanism 30.

The rotation speed on the input side of the variator 20 is specifically a rotation speed of an input shaft of the variator 20. The rotation speed on the input side of the variator 20 may be a rotation speed at a position, for example, at a side opposite to the variator 20 across a gear train in the aforementioned power transmission path. The same applies also for the rotation speed on the output side of the variator 20 and the rotation speed on the output side of the sub-transmission mechanism 30.

Besides these, output signals of an accelerator pedal opening sensor 44, an inhibitor switch 45, an engine rotation sensor 46 and the like are input to the controller 12.

The accelerator pedal opening sensor 44 detects an accelerator pedal opening APO representing an operated amount of an accelerator pedal. The inhibitor switch 45 detects the position of a select lever. The engine rotation sensor 46 detects a rotation speed Ne of the engine 1. The controller 12 can detect a vehicle speed VSP on the basis of the output signal of the rotation sensor 43.

The controller 12 generates a shift control signal on the basis of these signals and outputs the generated shift control signal to the hydraulic control circuit 11. The hydraulic control circuit 11 controls the line pressure PL, the PRI pressure and the SEC pressure and switches hydraulic pressure paths on the basis of the shift control signal from the controller 12.

In this way, the hydraulic pressure corresponding to the shift control signal is transmitted from the hydraulic control circuit 11 to each component of the variator 20 and the sub-transmission mechanism 30. As a result, the speed ratios of the variator 20 and the sub-transmission mechanism 30 are changed to speed ratios corresponding to the shift control signal, i.e. target speed ratios.

The transmission 100 is an automatic transmission and configured to include the hydraulic control circuit 11 and the controller 12 for controlling the speed ratios in this way, the rotation sensors 41, 42 and 43, the line pressure sensor 61, the PRI pressure sensor 62 and the SEC pressure sensor 63 besides the variator 20 and the sub-transmission mechanism 30. The transmission 100 may be configured to further include, for example, pressure sensors for detecting hydraulic pressures supplied to the plurality of friction engaging elements of the sub-transmission mechanism 30 and the like.

Figure 3:
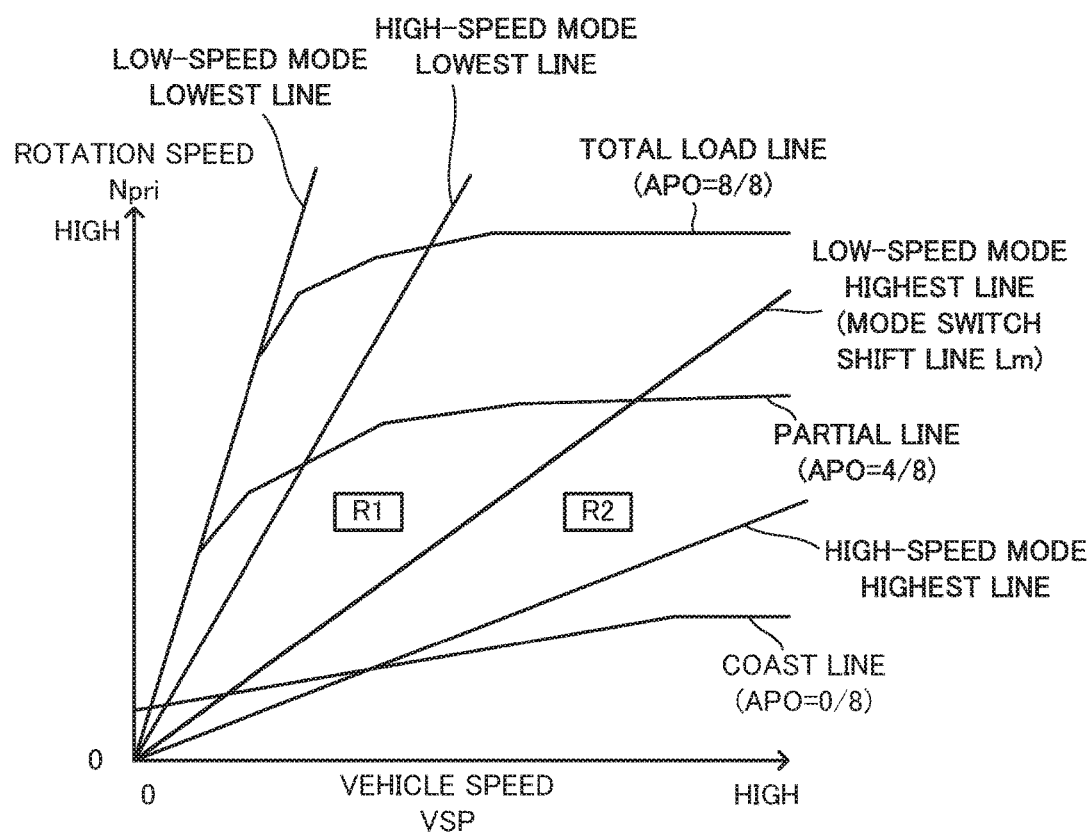
FIG. 3 is a graph showing an example of a shift map.

FIG. 3 is a graph showing an example of a shift map. In FIG. 3, a total load line which is a shift line when the accelerator pedal opening APO=8/8, a partial line which is a shift line when the accelerator pedal opening APO=4/8 and a coast line which is a shift line when the accelerator pedal opening APO=0 are illustrated as shift lines.

The transmission 100 is shifted on the basis of the shift map. In the shift map, an operating point of the transmission 100 is shown according to the vehicle speed VSP and a rotation speed Npri. The rotation speed Npri is a rotation speed of the PRI pulley 21.

The transmission 100 is shifted in accordance with the shift line selected according to the accelerator pedal opening APO. Thus, the shift line is set for each accelerator pedal opening APO in the shift map. In the shift map, the speed ratio of the transmission 100, i.e. the through speed ratio, is represented by a gradient of a line connecting the operating point of the transmission 100 and a zero point of the shift map.

When the gear position of the sub-transmission mechanism 30 is the first speed, the transmission 100 can be shifted between a low-speed mode lowest line obtained by maximizing the speed ratio of the variator 20 and a low-speed mode highest line obtained by minimizing the speed ratio of the variator 20.

When the gear position of the sub-transmission mechanism 30 is the second speed, the transmission 100 can be shifted between a high-speed mode lowest line obtained by maximizing the speed ratio of the variator 20 and a high-speed mode highest line obtained by minimizing the speed ratio of the variator 20.

A mode switch shift line Lm used to shift the sub-transmission mechanism 30 is further set in the shift map. In this example, the mode switch shift line Lm is set at the low-speed mode highest line. A region R1 represents a region having a lower vehicle speed VSP than the mode switch shift line Lm and a region R2 represents a region having a higher vehicle speed VSP than the mode switch shift line Lm.

The controller 12 starts shifting the sub-transmission mechanism 30 when the operating point of the transmission 100 crosses the mode switch shift line Lm. Further, as the sub-transmission mechanism 30 is shifted, the controller 12 carries out a coordinated shift for changing the speed ratio of the variator 20 in a direction opposite to a changing direction of the speed ratio of the sub-transmission mechanism 30.

Specifically, the controller 12 starts a 1-2 shift for upshifting the gear position of the sub-transmission mechanism 30 from the first speed to the second speed when the operating point of the transmission 100 crosses the mode switch shift line Lm from the region R1 toward the region R2. Further, in this case, the controller 12 specifically carries out a coordinated shift for changing the speed ratio of the variator 20 in a direction to increase the speed ratio, i.e. toward a Low side. The coordinated shift may include a shift of the sub-transmission mechanism 30.

A 2-1 shift for downshifting the gear position of the sub-transmission mechanism 30 from the second speed to the first speed is, for example, carried out according to an accelerator pedal operation or a select lever operation of a driver. In the case of carrying out the 2-1 shift, a coordinated shift for changing the speed ratio in a direction to decrease the speed ratio, i.e. toward a High side can be carried out in the variator 20.

Next, a target hydraulic pressure map in which a target PRI pressure serving as a target value of the PRI pressure, a target SEC pressure serving as a target value of the SEC pressure and a target line pressure PLt serving as a target value of the line pressure PL are set is described.

Figure 4A:
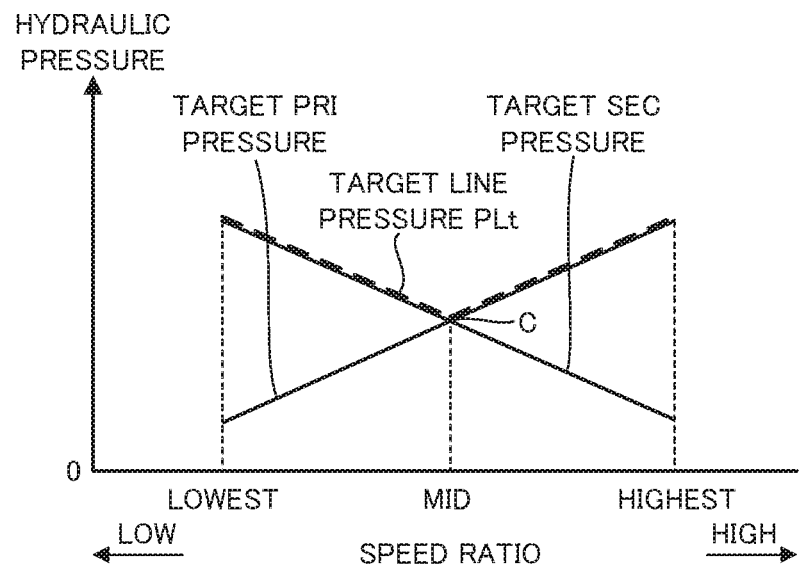
FIG. 4A is a graph showing an example of a target hydraulic pressure map in normal time.
Figure 4B:
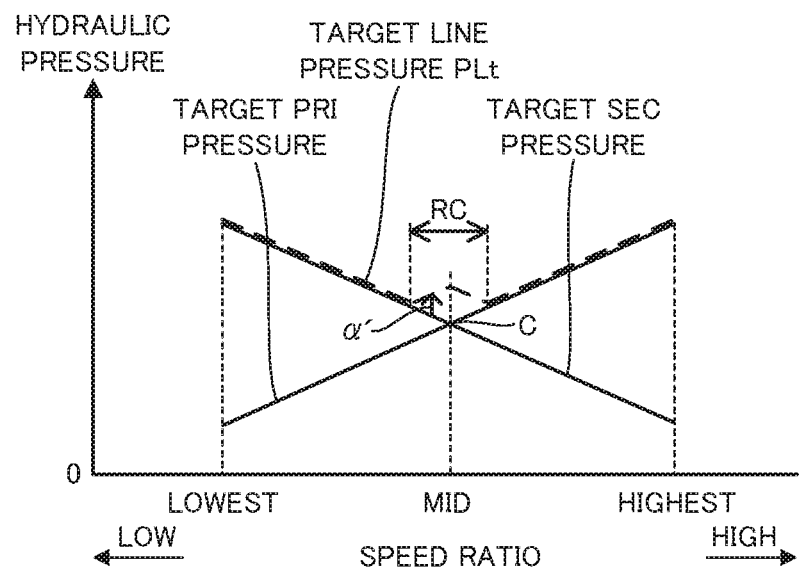
FIG. 4B is a graph showing a comparative example of the target hydraulic pressure map.

FIG. 4A is a graph showing an example of a target hydraulic pressure map in normal time. FIG. 4B is a graph showing a comparative example of the target hydraulic pressure map. The target hydraulic pressure map in normal time is a target hydraulic pressure map used when the sub-transmission mechanism 30 is not shifted. The comparative example of the target hydraulic pressure map is equivalent to a technique described in the background art.

As shown in FIG. 4A, the target PRI pressure and the target SEC pressure are set to switch a magnitude relationship of the PRI pressure and the SEC pressure according to the speed ratio of the variator 20.

The target PRI pressure and the target SEC pressure are set to be equal to each other at a Mid speed ratio which is a speed ratio between a lowest speed ratio and a highest speed ratio. The Mid speed ratio is a speed ratio corresponding to a cross point C where the target PRI pressure and the target SEC pressure are equal.

The target PRI pressure and the target SEC pressure are so set that the target SEC pressure is larger than the target PRI pressure in a speed ratio region equal to or higher than the lowest speed ratio and lower than the middle speed ratio, i.e. a speed ratio range on a lower side than the cross point C.

The target PRI pressure and the target SEC pressure are so set that the target PRI pressure is larger than the target SEC pressure in a speed ratio region higher than the middle speed ratio and equal to or lower than the highest speed ratio, i.e. a speed ratio range on a higher side than the cross point C.

As shown in FIG. 4A, the target line pressure PLt is set to the larger one of the target PRI pressure and the target SEC pressure when the sub-transmission mechanism 30 is not shifted.

Thus, the target line pressure PLt is the target SEC pressure in the speed ratio range on the lower side than the cross point C. Further, the target line pressure PLt is the target PRI pressure in the speed ratio range on the higher side than the cross point C. At the Mid speed ratio, the target line pressure PLt is the target PRI pressure and the target SEC pressure.

In the comparative example shown in FIG. 4B, the target line pressure PLt is set to a value obtained by adding a predetermined offset amount $\alpha'$, which is a variable value, to the higher one of the target PRI pressure and the target SEC pressure in a cross point region RC. The cross point region RC is a region where an absolute value of a deviation obtained by subtracting the target PRI pressure from the target SEC pressure is smaller than a predetermined deviation.

In this case, if the coordinated shift is started in a state where the speed ratio of the variator 20 is included in the cross point region RC, i.e. if the coordinated shift is started in the cross point region RC, a hydraulic pressure shortage of the variator 20 may occur as follows.

Specifically, in this case, the target line pressure PLt decreases immediately before the speed ratio of the variator 20 deviates from the cross point region RC. Further, the target line pressure PLt increases after the speed ratio of the variator 20 deviates from the cross point region RC. Thus, the actual line pressure PL may undershoot the target line pressure PLt due to an increase of the target line pressure PLt after a decrease.

For example, in the case of carrying out a coordinated shift for upshifting the sub-transmission mechanism 30 and downshifting the variator 20, the speed ratio of the variator 20 deviates toward the Low side from the cross point region RC. At this time, as the actual line pressure PL undershoots, the actual SEC pressure may also decrease. As a result, a hydraulic pressure shortage may occur at the SEC pulley 22 and troubles such as the slip of the belt 23 may occur.

Thus, in the present embodiment, the target line pressure PLt is set as follows during the 1-2 shift and 2-1 shift of the sub-transmission mechanism 30.

Figure 5A:
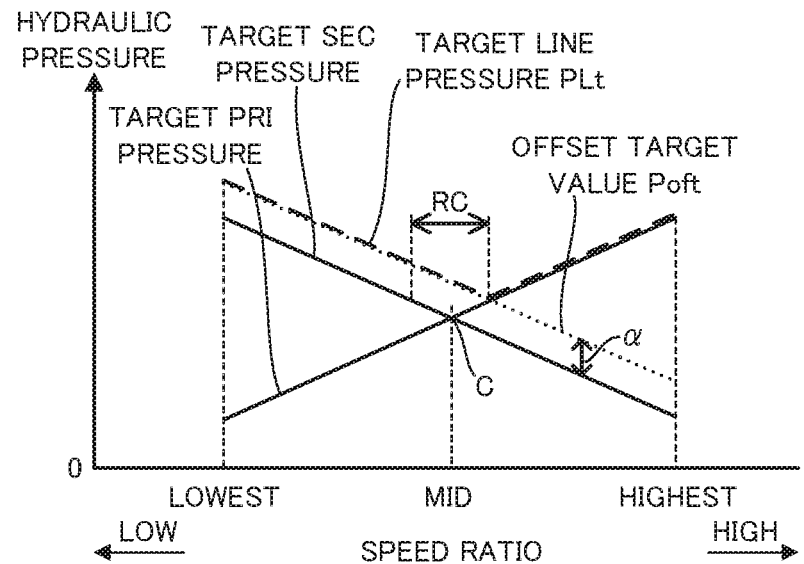
FIG. 5A is a graph showing an example of a target hydraulic pressure map during a 1-2 shift.
Figure 5B:
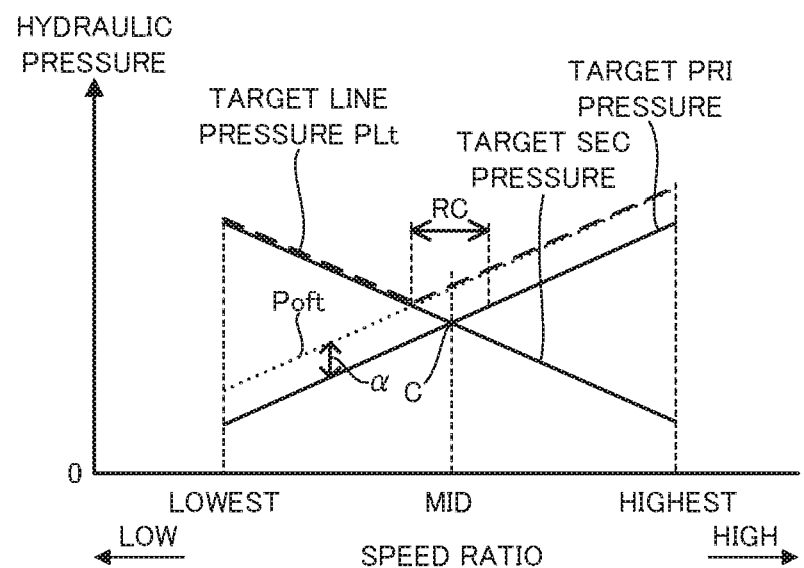
FIG. 5B is a graph showing an example of a target hydraulic pressure map during a 2-1 shift.

FIG. 5A is a graph showing an example of a target hydraulic pressure map during the 1-2 shift. FIG. 5B is a graph showing an example of a target hydraulic pressure map during the 2-1 shift. It should be noted that the target PRI pressure and the target SEC pressure are set as in the case of FIG. 4A in these target hydraulic pressure maps.

In both cases of FIGS. 5A and 5B, the target line pressure PLt is set to an offset target value Poft, which is a value obtained by adding a positive offset amount $\alpha$ to one of the target PRI pressure and the target SEC pressure, in a speed ratio range in which the offset target value Poft is higher than the other. The one of the target PRI pressure and the target SEC pressure is the higher one of the target PRI pressure and the target SEC pressure on a side toward which the speed ratio of the variator 20 changes in the coordinated shift.

During the 1-2 shift shown in FIG. 5A, the speed ratio of the variator 20 is changed toward the Low side by the coordinated shift. Thus, the higher one of the target PRI pressure and the target SEC pressure on the side toward which the speed ratio of the variator 20 changes is the target SEC pressure.

Thus, in this case, the target line pressure PLt is set to the offset target value Poft in a speed ratio range in which the offset target value Poft obtained by adding the offset amount $\alpha$ to the target SEC pressure is higher than the target PRI pressure.

In this way, even if the coordinated shift is started in the cross point region RC and the speed ratio of the variator 20 changes toward the Low side, the target line pressure PLt only increases instead of increasing after decreasing. When the variator 20 is downshifted by the coordinated shift as just described, the one of the target PRI pressure and the target SEC pressure is the target SEC pressure.

During the 2-1 shift shown in FIG. 5B, the speed ratio of the variator 20 is changed toward the High side by the coordinated shift. Thus, the higher one of the target PRI pressure and the target SEC pressure on the side toward which the speed ratio of the variator 20 changes is the target PRI pressure.

Thus, in this case, the target line pressure PLt is set to an offset target value Poft in a speed ratio range in which the offset target value Poft obtained by adding the offset amount α to the target PRI pressure is higher than the target SEC pressure.

In this way, even if the coordinated shift is started in the cross point region RC and the speed ratio of the variator 20 changes toward the High side, the target line pressure PLt only increases instead of increasing after decreasing. When the variator 20 is upshifted by the coordinated shift as just described, the one of the target PRI pressure and the target SEC pressure is the target PRI pressure.

Figure 6:
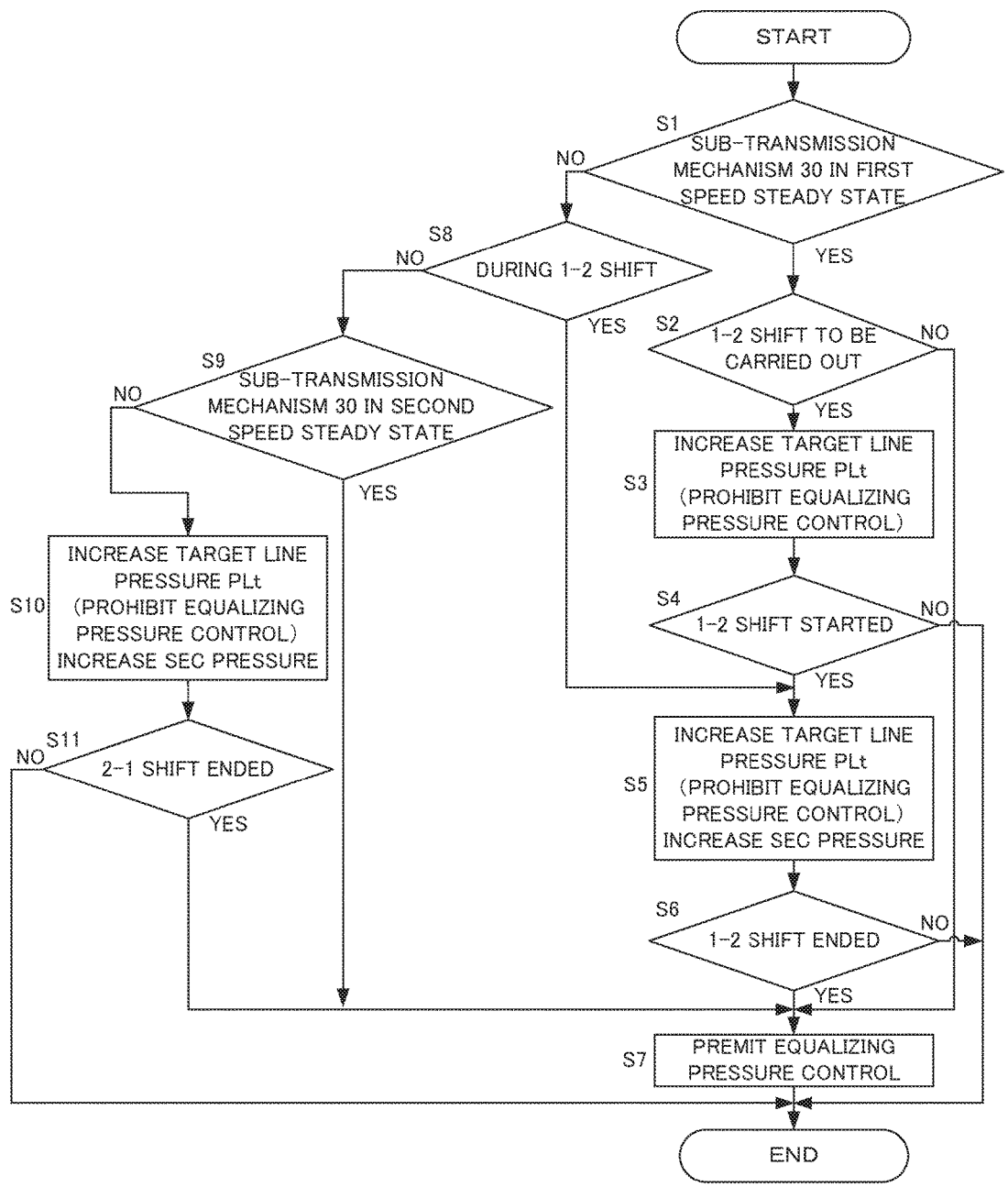
FIG. 6 is a flow chart showing an example of a control executed by a controller.

Next, an example of a control executed by the controller 12 is described using a flow chart shown in FIG. 6. The controller 12 can repeatedly perform a process shown in this flow chart at every infinitesimal time interval.

In Step S1, the controller 12 determines whether or not the sub-transmission mechanism 30 is in a first speed steady state. Such determination can be made on the basis of the shift map shown in FIG. 3. If the determination in Step S1 is affirmative, the process proceeds to Step S2.

In Step S2, the controller 12 predictively determines whether or not the 1-2 shift is to be carried out. Such predictive determination can be made by determining whether or not a target through speed ratio has fallen below a predetermined value. The predetermined value is set at a value slightly larger than a mode switch speed ratio, which is a speed ratio corresponding to the mode switch shift line Lm, i.e. set on the Low side.

The predictive determination may also be made, for example, by setting a predictive determination line along the mode switch shift line Lm in the region R1 in the shift map shown in FIG. 3 and determining whether or not the operating point of the transmission 100 has crossed the predictive determination line from the region R1 toward the region R2.

If the determination in Step S2 is negative, the process proceeds to Step S7. In Step S7, the controller 12 permits an equalizing pressure control of setting the target line pressure PLt to the higher one of the target PRI pressure and the target SEC pressure. The equalizing pressure control can be permitted by setting the target hydraulic pressure map shown in FIG. 4A as the target hydraulic pressure map to be referred to in setting the target line pressure PLt. The process of this flow chart is temporarily ended after Step S7.

If the determination in Step S2 is affirmative, the process proceeds to Step S3. In Step S3, the controller 12 increases the target line pressure PLt.

The target line pressure PLt can be increased by setting the target hydraulic pressure map shown in FIG. 5A as the target hydraulic pressure map to be referred to and setting the target line pressure PLt on the basis of the target hydraulic pressure map shown in FIG. 5A. The controller 12 can prohibit the equalizing pressure control by increasing the target line pressure PLt.

The target line pressure PLt may be increased, for example, by calculating the target line pressure PLt set in the target hydraulic pressure map shown in FIG. 5A on the basis of the target hydraulic pressure map shown in FIG. 4A every time.

In Step S4, the controller 12 determines whether or not the 1-2 shift has been started. Such determination can be made by determining whether or not the operating point of the transmission 100 has crossed the mode switch shift line Lm from the region R1 toward the region R2 in the shift map shown in FIG. 3.

If the determination in Step S4 is negative, the process of this flow chart is temporarily ended since the 1-2 shift has not been started yet although it was predicted that the 1-2 shift would be carried out.

If the determination in Step S4 is affirmative, the process proceeds to Step S5. The speed ratio of the sub-transmission mechanism 30 changes in an inertia phase, which is a shift phase in which the speed ratio of the sub-transmission mechanism 30 actually changes, after the start of the shift is determined in this way.

In Step S5, the controller 12 increases the target line pressure PLt and also increases the SEC pressure. Specifically, if the 1-2 shift has been started, not only the target line pressure PLt continues to be increased, but also the SEC pressure is increased.

The SEC pressure is specifically increased by increasing the target SEC pressure to a predetermined value. The predetermined value is set at a value, at which the belt 23 does not slip, in consideration of an inertia torque amount caused by a change in the rotation speed of the SEC pulley 22 occurring in the inertia phase of the sub-transmission mechanism 30. The predetermined value may be a variable value.

By increasing the SEC pressure, the SEC pressure is increased on the basis of a torque variation caused by a torque input to the variator 20 according to the shift of the sub-transmission mechanism 30.

In Step S6, the controller 12 determines whether or not the 1-2 shift has been finished. Such determination can be made by determining whether or not the high clutch 33 has been engaged and the low brake 32 has been disengaged.

If the determination in Step S6 is negative, the process of this flow chart is temporarily ended since the 1-2 shift is being carried out. The inertia phase is started and the speed ratio of the sub-transmission mechanism 30 is actually changed while the determination in Step S6 is negative in the subsequent routine(s).

If the determination in Step S6 is affirmative, the process proceeds to Step S7. Specifically, since the 1-2 shift has been ended, the controller 12 permits the equalizing pressure control.

If the determination in Step S1 is negative, the process proceeds to Step S8 and the controller 12 determines whether or not the 1-2 shift is being carried out in Step S8.

If the determination in Step S6 was negative in the last routine, affirmative determination is made in Step S8 and the process proceeds to Step S5. Unless the determination in Step S6 was negative in the last routine, the 1-2 shift is not being carried out. Thus, the determination in Step 8 is negative and the process proceeds to Step S9.

In Step S9, the controller 12 determines whether or not the sub-transmission mechanism 30 is in a second speed steady state. If the determination in Step S9 is affirmative, the process proceeds to Step S7 and the equalizing pressure control is permitted.

If the determination in Step S9 is negative, the controller 12 determines that the 2-1 shift including a shift starting time of the 2-1 shift is being carried out. In this case, the process proceeds to Step S10.

In Step S10, the controller 12 increases the target line pressure PLt.

In the case of the 2-1 shift, the target line pressure PLt can be increased by setting the target hydraulic pressure map shown in FIG. 5B as the target hydraulic pressure map to be referred to and setting the target line pressure PLt on the basis of the target hydraulic pressure map shown in FIG. 5B.

Also in this case, the controller 12 can prohibit the equalizing pressure control by increasing the target line pressure PLt.

The target line pressure PLt may be increased, for example, by calculating the target line pressure PLt set in the target hydraulic pressure map shown in FIG. 5B on the basis of the target hydraulic pressure map shown in FIG. 4A every time.

In Step S10, the controller 12 further increases the SEC pressure. Specifically, when the 2-1 shift is started, not only the target line pressure PLt, but also the SEC pressure is increased. The SEC pressure is increased in a manner as described in Step S5.

In Step S11, the controller 12 determines whether or not the 2-1 shift has been ended. Such determination can be made by determining whether or not the high clutch 33 has been disengaged and the low brake 32 has been engaged.

If the determination in Step S11 is negative, the process of this flow chart is temporarily ended. In this case, the processing of Step S10 is continuously performed until the determination in Step S11 becomes affirmative in the subsequent routine. If the determination in Step S11 is affirmative, the process proceeds to Step S7 and the equalizing pressure control is permitted.

Figure 7:
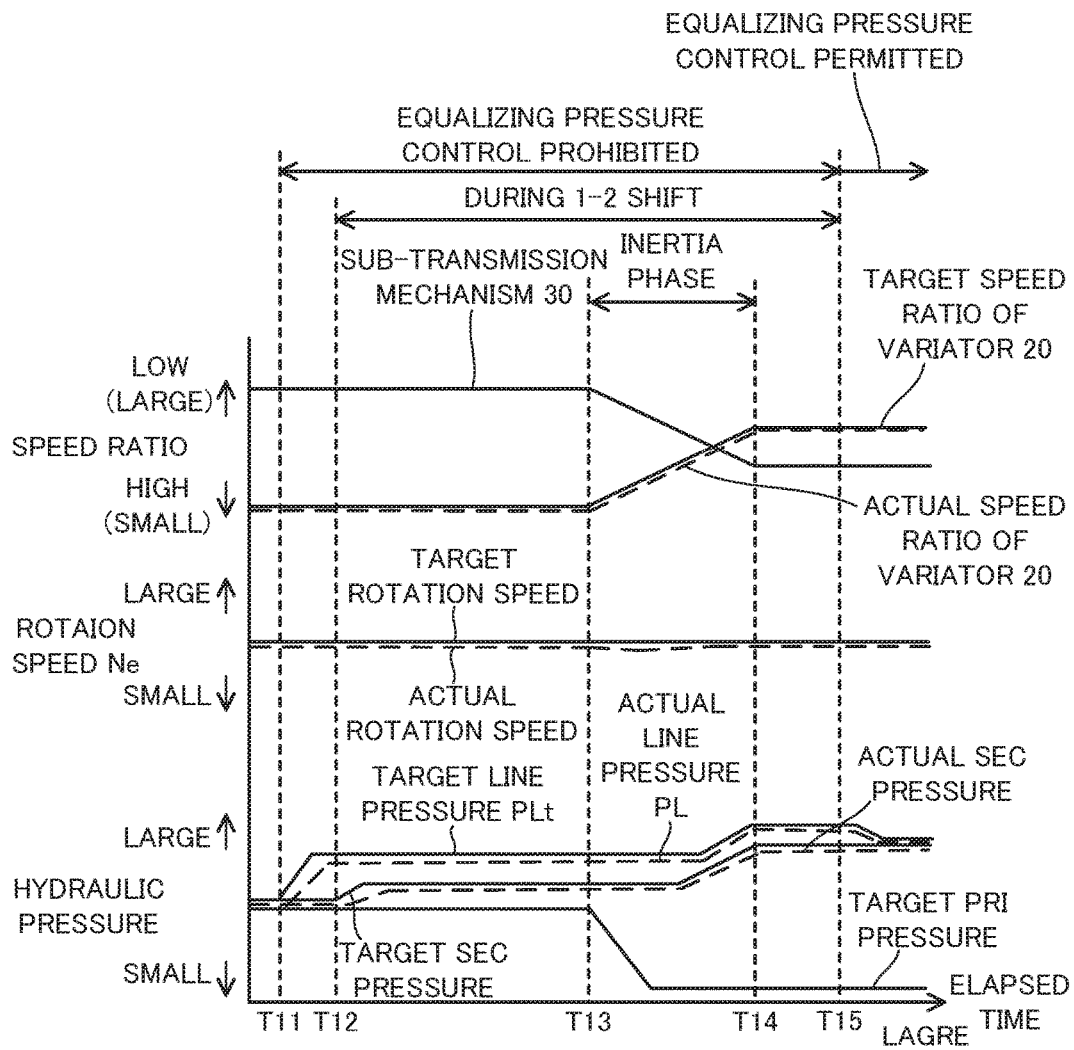
FIG. 7 is an example of a timing chart during the 1-2 shift.

FIG. 7 is an example of a timing chart during the 1-2 shift.

Timing T11 is a timing at which it is predictively determined that the 1-2 shift will be carried out. Thus, the target line pressure PLt is increased and the equalizing pressure control is prohibited from timing T11.

Timing T12 is a timing at which the start of the 1-2 shift is determined. Thus, the SEC pressure is increased from timing T12. The SEC pressure continues to be increased until the target SEC pressure based on the target hydraulic pressure map shown in FIG. 5A becomes larger than the target SEC pressure increased to the predetermined value by increasing the SEC pressure. In other words, the larger one of the target SEC pressure based on the target hydraulic pressure map shown in FIG. 5A and the target SEC pressure increased to the predetermined value by increasing the SEC pressure is used as the target SEC pressure.

Even if the SEC pressure is increased, the target hydraulic pressure map to be referred to itself is set to the target hydraulic pressure map shown in FIG. 5A at timing T11. Thus, also in this case, the prohibition of the equalizing pressure control itself is valid.

At timing T13, the inertia phase of the sub-transmission mechanism 30 is started. Thus, the speed ratio of the sub-transmission mechanism 30 decreases and the speed ratio of the variator 20 increases together with the target speed ratio and the actual speed ratio due to the coordinated shift from timing T13.

The inertia phase is ended at timing T14 and the 1-2 shift is ended at timing T15. Thus, the equalizing pressure control is permitted from timing T15.

When the variator 20 is downshifted by the coordinated shift, i.e. when the speed ratio of the variator 20 is increased, the target PRI pressure, the target SEC pressure and the target line pressure PLt are set on the basis of FIG. 5A. The target SEC pressure is specifically set on the basis of FIG. 5A when the SEC pressure can be no longer increased.

Thus, in this example, the target PRI pressure decreases and the target line pressure PLt and the target SEC pressure increase in the inertia phase. Accordingly, even if the coordinated shift is started in the cross point region RC and the speed ratio of the variator 20 changes toward the Low side, the target line pressure PLt and the target SEC pressure do not increase after decreasing.

Figure 8:
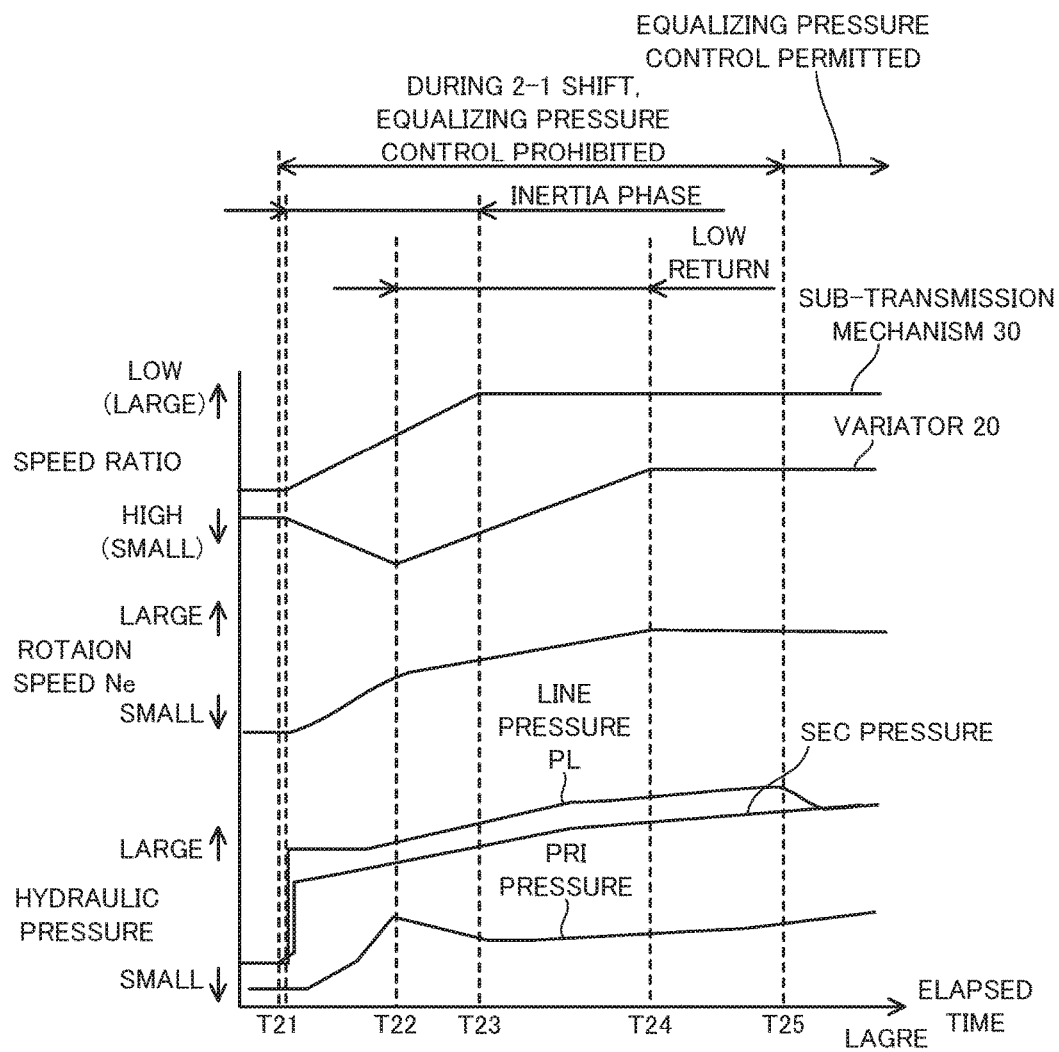
FIG. 8 is an example of a timing chart during the 2-1 shift.

FIG. 8 is an example of a timing chart during the 2-1 shift. In FIG. 8, only actual values are shown for each parameter.

Timing T21 is a timing at which the start of the 2-1 shift is determined. At timing T21, the target line pressure PLt is increased and the equalizing pressure control is prohibited. As a result, the line pressure PL increases immediately after timing T21. At timing T21, the SEC pressure is also increased. As a result, the SEC pressure also increases immediately after timing T21.

During the 2-1 shift, the target line pressure PLt and the SEC pressure are increased before the start of the inertia phase of the sub-transmission mechanism 30 by being increased when the start of the shift is determined.

According to the target hydraulic pressure map shown in FIG. 5B, the speed ratio changes toward the High side when the variator 20 is upshifted. Thus, the target SEC pressure is decreased in relation to the speed ratio.

In this example, the target SEC pressure is set to be larger than the target SEC pressure set in the target hydraulic pressure map shown in FIG. 5B by increasing the SEC pressure at least between timing T21 and timing T22. Thus, in this example, the SEC pressure increases even if the inertia phase is started and the speed ratio of the variator 20 is changed toward the High side.

Further, in this example, the line pressure PL is increased to be able to keep increasing the SEC pressure in addition to increasing the target line pressure PLt. The line pressure PL is specifically increased by setting the target line pressure PLt larger than the target SEC pressure.

In this example, the target line pressure PLt is set larger than the target line pressure PLt set in the target hydraulic pressure map shown in FIG. 5B at least at timing T21. Thus, in this example, the line pressure PL is constant even if the inertia phase is started and the speed ratio of the variator 20 starts being changed toward the High side. The line pressure PL is increased prior to the SEC pressure.

The SEC pressure continues to be increased until the target SEC pressure based on the target hydraulic pressure map shown in FIG. 5B becomes larger than the target SEC pressure increased to the predetermined value by increasing the SEC pressure. In other words, the larger one of the target SEC pressure based on the target hydraulic pressure map shown in FIG. 5B and the target SEC pressure increased to the predetermined value by increasing the SEC pressure is used as the target SEC pressure. The same applies also for an increase of the line pressure PL.

Even if the SEC pressure and the line pressure PL are increased, the target hydraulic pressure map to be referred to itself is set to the target hydraulic pressure map shown in FIG. 5B at timing T21. Thus, also in this case, the prohibition of the equalizing pressure control itself is valid. The SEC pressure and the line pressure PL can be so increased as not to decrease the SEC pressure.

In the case of the 2-1 shift, the inertia phase is started immediately after timing T21. After the start of the inertia phase, the speed ratio of the sub-transmission mechanism 30 increases and the speed ratio of the variator 20 decreases. In this example, the speed ratio of the variator 20 is so decreased that the through speed ratio is not excessively increased by the 2-1 shift of the sub-transmission mechanism 30.

In the transmission 100, the coordinated shift is carried out not only in the case of causing the through speed ratio to reach the target through speed ratio, but also in the case of changing the speed ratio of the variator 20 as shown in this example as the sub-transmission mechanism 30 is shifted.

At timing T22, a Low return, which is a control to return the speed ratio of the variator 20 toward the Low side, is started. As a result, the speed ratio of the variator 20 increases from timing T22. The inertia phase is ended at timing T23 and the Low return is ended at timing T24. The 2-1 shift is ended at timing T25. Thus, the equalizing pressure control is permitted from timing T25.

Although the SEC pressure and the line pressure PL are increased as described above in the 2-1 shift, the target PRI pressure, the target SEC pressure and the target line pressure PLt are set on the basis of the target hydraulic pressure map of FIG. 5B when the SEC pressure and the line pressure PL can be no longer increased in upshifting the variator 20 by the coordinated shift.

According to the target hydraulic pressure map of FIG. 5B, even if the coordinated shift is started in the cross point region RC and the speed ratio of the variator 20 changes toward the High side, the target line pressure PLt and the target PRI pressure do not increase after decreasing.

Next, main functions and effects of the transmission 100 are described.

The transmission 100 includes the variator 20, the sub-transmission mechanism 30, the line pressure adjusting unit 11s, the PRI pressure adjusting unit 11a, the SEC pressure adjusting unit 11b and the controller 12. The controller 12 is provided, as a shift control unit configured to carry out the coordinated shift, in the transmission 100. Further, the controller 12 is provided, as a setting unit configured to set the target line pressure PLt, in the transmission 100.

The controller 12 serving as the setting unit sets the target line pressure PLt to the offset target value Poft, which is a value obtained by adding the positive offset amount α to one of the target PRI pressure and the target SEC pressure, in a speed ratio range in which the offset target value Poft is larger than the other at least during the inertia phase in the sub-transmission mechanism 30 when the coordinated shift is carried out. At that time, the controller 12 serving as the setting unit sets the target SEC pressure as the one of the target PRI pressure and the target SEC pressure when the variator 20 is downshifted by the coordinated shift and sets the target PRI pressure as such when the variator 20 is upshifted by the coordinated shift.

According to the transmission 100 thus configured, the target line pressure PLt is set to the offset target value Poft as described above. Thus, when the coordinated shift is started in the cross point region RC and the speed ratio of the variator 20 is changed, the target line pressure PLt can be increased according to such a change. Specifically, the target line pressure PLt can be prevented from increasing after decreasing.

Thus, according to the transmission 100 thus configured, the line pressure PL can be prevented from undershooting due to an increase of the target line pressure PLt after a decrease. Therefore, a situation where a hydraulic pressure shortage occurs in the variator 20 during the coordinated shift can be improved.

In the transmission 100, the controller 12 serving as the setting unit sets the target line pressure PLt before the start of the inertia phase in the sub-transmission mechanism 30.

According to the transmission 100 thus configured, even if the target line pressure PLt is set to the offset target value Poft, it can be prevented or suppressed that the line pressure PL falls below the target line pressure PLt at the start of the inertia phase due to a delay in responsiveness of the hydraulic pressure supply. Specifically, a situation where a hydraulic pressure shortage occurs in the variator 20 during the coordinated shift due to a delay in responsiveness of the hydraulic pressure supply can be prevented or suppressed.

In the inertia phase, the belt 23 possibly slips due to a torque variation caused by a torque input to the variator 20 according to the shift of the sub-transmission mechanism 30. Further, if the line pressure PL and the SEC pressure are increased at the same timing, a hydraulic pressure variation width increases and an unintended variation of the speed ratio possibly occurs.

In view of such a situation, in the transmission 100, the controller 12 serving as the shift control unit increases the SEC pressure when the start of the shift of the sub-transmission mechanism 30 is determined in the case of upshifting the sub-transmission mechanism 30. Further, the controller 12 serving as the setting unit sets the target line pressure PLt to the offset target value Poft before the start of the shift of the sub-transmission mechanism 30 is determined.

According to the transmission 100 thus configured, since the SEC pressure can be increased before the start of the inertia phase, it can be prevented or suppressed that the belt 23 slips due to a torque variation caused according to the shift of the sub-transmission mechanism 30 in the inertia phase. Further, since the line pressure PL, which will become the source pressure of the SEC pressure, is increased prior to the SEC pressure, an unintended variation of the speed ratio can be prevented or suppressed.

The sub-transmission mechanism 30 is upshifted in a driving state where the driver hardly operates the accelerator pedal. Thus, when the sub-transmission mechanism 30 is upshifted, a sense of incongruity is given to the driver if an unintended variation of the speed ratio occurs.

On the other hand, the sub-transmission mechanism 30 is downshifted when the driver depresses the accelerator pedal or operates the select lever. Thus, in this case, the driver's request to accelerate needs to be satisfied by carrying out the shift as quickly as possible. Further, in this case, since the driver's operation to request acceleration is accompanied, even if an unintended variation of the speed ratio occurs, it is hardly sensed by the driver as a phenomenon in which a sense of incongruity is given.

In view of such a situation, in the transmission 100, the controller 12 serving as the shift control unit increases the SEC pressure when the start of the shift of the sub-transmission mechanism 30 is determined in the case of downshifting the sub-transmission mechanism 30. Further, the controller 12 serving as the setting unit sets the target line pressure PLt to the offset target value Poft when the start of the shift of the sub-transmission mechanism 30 is determined.

According to the transmission 100 thus configured, when the sub-transmission mechanism 30 is downshifted, the line pressure PL and the SEC pressure are simultaneously increased when the start of the shift is determined instead of successively increasing these pressures at a certain time interval. Thus, shift responsiveness can be enhanced to satisfy the acceleration request.

Although the embodiment of the present invention has been described above, the above embodiment is merely an illustration of one application example of the present invention and not intended to limit the technical scope of the present invention to the specific configuration of the above embodiment.

Although the sub-transmission mechanism 30 has been described to have two forward gear positions in the above embodiment, the sub-transmission mechanism 30 may, for example, have three or more forward gear positions.

When the coordinated shift is carried out, such as the start of the inertia phase, the controller 12 serving as the setting unit may not set the target line pressure PLt to the offset target value Poft if the speed ratio of the variator 20 is not included in the cross point region RC.

In other words, when the coordinated shift is carried out, the controller 12 serving as the setting unit may set the target line pressure PLt to the offset target value Poft if the speed ratio of the variator 20 is included in the cross point region RC.

A fuel economy improvement and the like can be realized by decreasing a chance of increasing the line pressure PL in this way. In this case, the controller 12 can set the target line pressure PLt on the basis of the target hydraulic pressure map shown in FIG. 4A.

Although the drive source is the engine 1 in the above embodiment, the drive source may be, for example, a motor or a combination of an engine and a motor.

The present application claims a priority based on Japanese Patent Application No. 2015-125529 filed with the Japan Patent Office on Jun. 23, 2015, all the contents of which are hereby incorporated by reference.

The invention claimed is:

1. A transmission, comprising:
   a continuously variable transmission mechanism including a primary pulley, a secondary pulley and a belt mounted on the primary pulley and the secondary pulley, a primary pressure being supplied to the primary pulley, a secondary pressure being supplied to the secondary pulley, the continuously variable transmission mechanism being provided in a power transmission path for transmitting power from a drive source of a vehicle to drive wheels;
   a stepped transmission mechanism provided in series with the continuously variable transmission mechanism in the power transmission path;
   a line pressure regulator configured to adjust a line pressure;
   a primary pressure regulator configured to adjust the primary pressure using the line pressure as a source pressure;
   a secondary pressure regulator configured to adjust the secondary pressure using the line pressure as a source pressure; and
   a controller configured to carry out a coordinated shift for changing a speed ratio of the continuously variable transmission mechanism in a direction opposite to a changing direction of a speed ratio of the stepped transmission mechanism as the stepped transmission mechanism is shifted, and configured to set a target value of the line pressure,
   in setting the target value of the line pressure to an offset target value, the offset target value being a value obtained by adding a positive offset amount to one of a target value of the primary pressure and a target value of the secondary pressure, in a speed ratio range in which the offset target value is higher than the other target value at least during an inertia phase in the stepped transmission mechanism when the coordinated shift is carried out,
   the controller setting the one target value to the target value of the secondary pressure when the continuously variable transmission mechanism is downshifted by the coordinated shift and setting the one target value to the target value of the primary pressure when the continuously variable transmission mechanism is upshifted by the coordinated shift.

2. The transmission according to claim 1, wherein:
   the controller sets the target value of the line pressure before the inertia phase is started in the stepped transmission mechanism.

3. The transmission according to claim 2, wherein:
   when the stepped transmission mechanism is upshifted,
   the controller increases the secondary pressure on the basis of a torque variation caused by a torque input to the continuously variable transmission mechanism according to the shift of the stepped transmission mechanism when the start of the shift of the stepped transmission mechanism is determined, and
   the controller sets the target value of the line pressure to the offset target value before the start of the shift of the stepped transmission mechanism is determined.

4. The transmission according to claim 2, wherein:
   when the stepped transmission mechanism is downshifted,
   the controller increases the secondary pressure on the basis of a torque variation caused by a torque input to the continuously variable transmission mechanism according to the shift of the stepped transmission mechanism when the start of the shift of the stepped transmission mechanism is determined, and
   the controller sets the target value of the line pressure to the offset target value when the start of the shift of the stepped transmission mechanism is determined.

5. A control method for a transmission with a continuously variable transmission mechanism including a primary pulley, a secondary pulley and a belt mounted on the primary pulley and the secondary pulley, a primary pressure being supplied to the primary pulley, a secondary pressure being supplied to the secondary pulley, the continuously variable transmission mechanism being provided in a power transmission path for transmitting power from a drive source of a vehicle to drive wheels, a stepped transmission mechanism provided in series with the continuously variable transmission mechanism in the power transmission path, a line pressure regulator configured to adjust a line pressure, a primary pressure regulator configured to adjust the primary pressure using the line pressure as a source pressure, and a secondary pressure regulator configured to adjust the secondary pressure using the line pressure as a source pressure, comprising:
   carrying out a coordinated shift for changing a speed ratio of the continuously variable transmission mechanism in a direction opposite to a changing direction of a speed ratio of the stepped transmission mechanism as the stepped transmission mechanism is shifted; and
   in setting the target value of the line pressure to an offset target value, the offset target value being a value obtained by adding a positive offset amount to one of a target value of the primary pressure and a target value of the secondary pressure, in a speed ratio range in which the offset target value is higher than the other target value at least during an inertia phase in the stepped transmission mechanism when the coordinated shift is carried out,
   setting the one target value to the target value of the secondary pressure when the continuously variable transmission mechanism is downshifted by the coordinated shift and setting the one target value to the target value of the primary pressure when the continuously variable transmission mechanism is upshifted by the coordinated shift.

6. A transmission, comprising:
a continuously variable transmission mechanism including a primary pulley, a secondary pulley and a belt mounted on the primary pulley and the secondary pulley, a primary pressure being supplied to the primary pulley, a secondary pressure being supplied to the secondary pulley, the continuously variable transmission mechanism being provided in a power transmission path for transmitting power from a drive source of a vehicle to drive wheels;
a stepped transmission mechanism provided in series with the continuously variable transmission mechanism in the power transmission path;
line pressure adjusting means for adjusting a line pressure;
primary pressure adjusting means for adjusting the primary pressure using the line pressure as a source pressure;
secondary pressure adjusting means for adjusting the secondary pressure using the line pressure as a source pressure;
shift control means for carrying out a coordinated shift for changing a speed ratio of the continuously variable transmission mechanism in a direction opposite to a changing direction of a speed ratio of the stepped transmission mechanism as the stepped transmission mechanism is shifted; and
setting means for setting a target value of the line pressure,
in setting the target value of the line pressure to an offset target value, the offset target value being a value obtained by adding a positive offset amount to one of a target value of the primary pressure and a target value of the secondary pressure, in a speed ratio range in which the offset target value is higher than the other target value at least during an inertia phase in the stepped transmission mechanism when the coordinated shift is carried out,
the setting means setting the one target value to the target value of the secondary pressure when the continuously variable transmission mechanism is downshifted by the coordinated shift and setting the one target value to the target value of the primary pressure when the continuously variable transmission mechanism is upshifted by the coordinated shift.

* * * * *